(Specimens.)
H. E. STURCKE.
AMORPHOUS CARBONATE OF LIME AND METHOD OF AND APPARATUS FOR OBTAINING SAME.
No. 601,007. Patented Mar. 22, 1898.
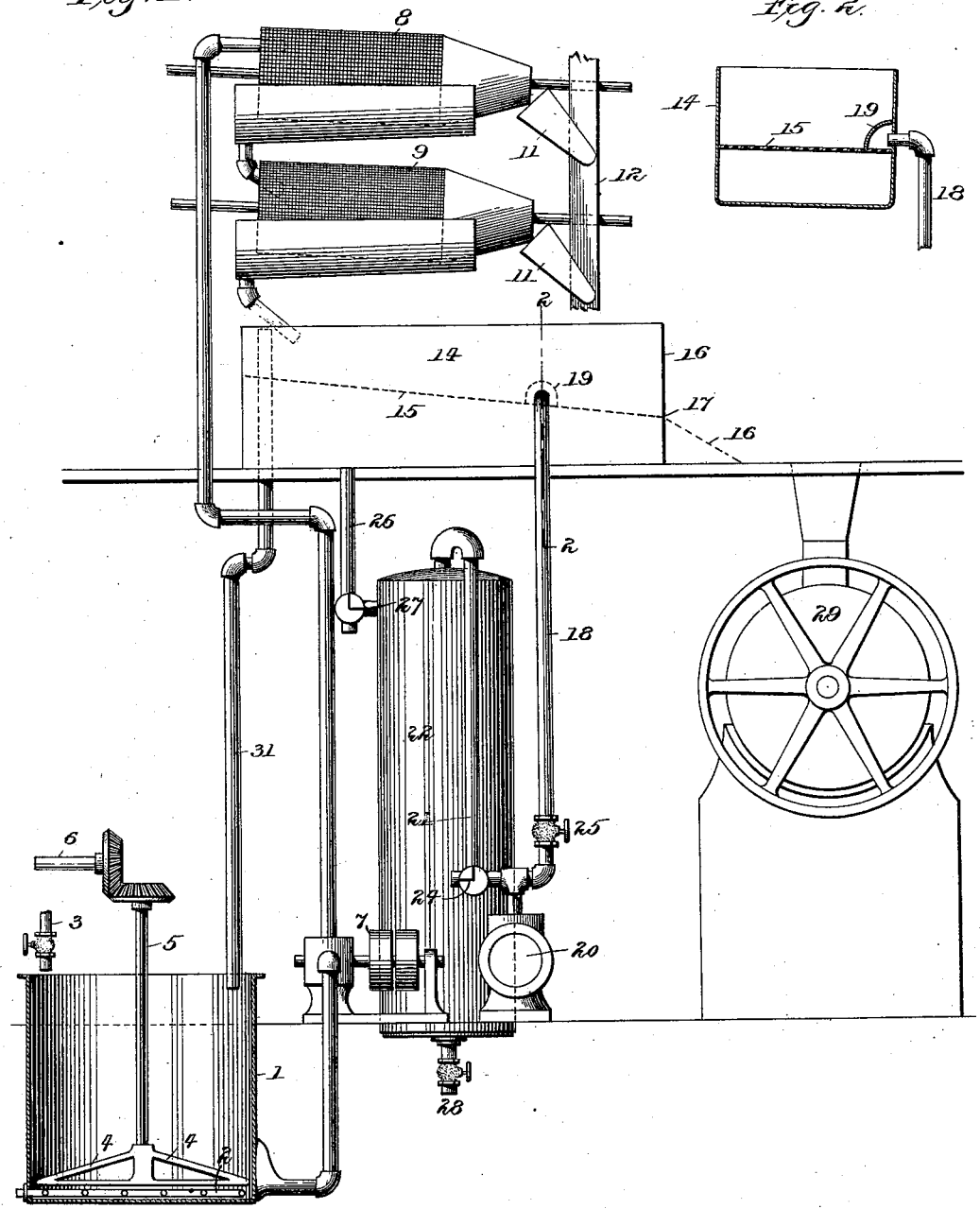
WITNESSES:
INVENTOR
BY
ATTORNEY.

UNITED STATES PATENT OFFICE.

HERMAN E. STURCKE, OF NEW YORK, N. Y., ASSIGNOR TO THE AETNA CHEMICAL COMPANY, OF SAME PLACE.

AMORPHOUS CARBONATE OF LIME AND METHOD OF AND APPARATUS FOR OBTAINING SAME.

SPECIFICATION forming part of Letters Patent No. 601,007, dated March 22, 1898.

Application filed February 8, 1898. Serial No. 669,525. (Specimens.)

*To all whom it may concern:*

Be it known that I, HERMAN EDWARD STURCKE, a citizen of the United States, residing in the city of New York, borough of Manhattan, and State of New York, have invented and produced a new and useful Amorphous Carbonate of Lime and Improvements in the Process of and Apparatus for Treating the Residues Obtained in the Manufacture of Caustic Soda or Caustic Potash for the Production of such Amorphous Carbonate of Lime, of which the following is a specification.

In the manufacture of caustic soda or caustic potash by treating soda-ash or potash solutions with caustic lime a residue is obtained which at the present time is not only worthless, but is a source of much annoyance to manufacturers of caustic soda and caustic potash, as it accumulates in large quantities and is disposed of only with difficulty. This residue I find, whether obtained in the manufacture of caustic soda or of caustic potash, consists principally of carbonate of lime, caustic or hydrated lime, and impurities.

It is the prime object of my invention to obtain from these residues a new and valuable article of manufacture—namely, substantially pure amorphous carbonate of lime—which will be capable of use as whiting, paris-white, gilders' white, and for similar purposes.

A further object of my invention is to provide a process by which such residues may be treated for obtaining such a product.

A final object of the invention is to provide an apparatus for carrying out the process of treating such residues for obtaining such a product.

The essential discovery which I have made in connection with the invention is that the carbonate of lime obtained in the caustic-soda residues referred to is capable of being practically entirely separated from all insoluble impurities contained in such residues—such as coal, sand, dirt, &c.—by mechanical means—such as by screening, floating, or jigging. In this way the carbonate of lime is separated from such insoluble impurities; but it generally contains varying quantities of caustic lime, all or most of which should be removed and which may be converted into carbonate of lime, either before or after the mechanical separation, by treatment with carbonic acid or else dissolved by a suitable acid, as will be explained. If, however, the caustic lime contained in the carbonate is of small quantity, it will be dissolved in the relatively large excess of water used and will be removed in the subsequent separation of the water or liquid from the solid insoluble carbonate of lime, as will be explained, so that in the latter case the treatment with carbonic acid or any other suitable acid will not be necessary. I find, moreover, that even if relatively large traces of caustic lime remain with the carbonate of lime the final drying and exposing of the carbonate of lime to atmospheric air or to other gases containing carbonic acid will transform the caustic lime into carbonate of lime, so that it will be understood that the chemical treatment of the carbonate of lime after mechanical separation from the impurities or of the caustic-soda residue prior to such mechanical separation is not an absolute essential to the success of my process, the essence of which consists, as stated, of the separation of carbonate of lime from the several insoluble impurities found in caustic-soda residue by mechanical means—such as screening, floating, or jigging—it being understood, however, that whatever the way or means most and preferably all of the caustic lime should be removed, so that the resulting product will be practically free of caustic.

In carrying out my improved process I proceed substantially as follows: The lime residue obtained from the manufacture of caustic soda, when such residue is in the form of more or less dried cakes or in a more or less consistent paste or mush, is mixed with a large excess of water and stirred up therewith until a relatively thin milk of carbonate of lime results. During this mixing or stirring there is preferably added either a sufficient quantity of a liquid acid—such as hydrochloric acid, acetic acid, sulfuric acid, or sulfurous acid—to dissolve the intermixed caustic or hydrated lime, or else sufficient carbonic acid (in gas form or otherwise) is injected into or added with the milk of carbonate of lime to transform such caustic or hydrated lime into carbonate of lime. It is, however, not absolutely necessary to remove all the caustic or hydrated lime by a liquid acid or to transform such caustic lime by carbonic acid into carbonate, because when the process of manufacturing caustic soda from soda-ash with caustic lime is properly carried out the lime residue contains but relatively little caustic lime, and if such is the case the small amount is readily dissolved in the relatively large excess of water and removed in the subsequent separation of the water or liquid from the solid insoluble carbonate of lime. It is therefore frequently only necessary to mix the lime residue with water in order to dissolve the caustic lime, and even, as stated in the introductory part of this specification, if relatively large traces of caustic lime remain with the carbonate of lime the final drying and exposure of the carbonate to the atmospheric air or to other gases containing carbonic acid will transform the caustic into carbonate. Hence, as stated, it is not necessary to remove the caustic lime or to transform it by the chemical means indicated. The thin milk of carbonate of lime, whether the same has been treated for the dissolution or transformation of caustic, as explained, or not, is now subjected to a mechanical treatment to effect the separation of the carbonate from practically all other insoluble solid impurities, and in this mechanical separation lies the essentially novel feature of this part of my invention.

The mechanical treatment of the milk of carbonate of lime may be effected by screening and sifting or by floating, or by a combination of both, or by jigging, or by any other of the mechanical manipulations by which substances of different degrees of fineness or of different specific gravities are separated one from the other. Preferably, however, I effect this separation by screening, since I find that the carbonate of lime obtained from the residue resulting from the manufacture of caustic soda when intimately mixed with water is in the form of extremely-fine particles, which are much finer than the greatest portion of the solid impurities usually accompanying the carbonate of lime in the residue. This carbonate of lime can readily be passed through a wire screen or gauze of one hundred, one hundred and fifty, and even two hundred meshes to the linear inch. It is therefore only necessary to pass the thin milk of carbonate of lime through a very fine screen in order to retain and separate the largest portion of the solid impurities. In practice it has been found that it is advantageous to pass the thin milk of carbonate of lime through two or more screens of successively-increasing fineness of mesh, the first screen being relatively coarse—for instance, forty meshes to the linear inch—the next screen somewhat finer—for instance, one hundred meshes to the linear inch—and the last screen being very fine—for instance, one hundred and fifty or two hundred meshes to the linear inch. When a plurality of screens are used, I find that the first screen will retain the bulk of the coarser particles, thereby avoiding clogging up of the last or finest screen. When the carbonate of lime is passed through screens of the proper mesh, I find that ninety-five per cent. and more of the impurities are separated from the carbonate. The form of the screens employed is not essential to the success of the operation, it being possible to use stationary or rocking, flat, horizontal, or slightly-inclined screens with or without brushes coöperating with the same, or they may be horizontal or vertical revolving cylinders with or without such brushes. I prefer, however, to employ slightly-inclined horizontal revolving cylindrical screens, because with that character of screens provision is made for the automatic discharge of the impurities which are retained by the screen.

The thin milk of carbonate of lime after passing the screens holds in suspension practically only pure carbonate, and it is run into a reservoir, if necessary, from which or directly from the screens it passes into settling-tanks or onto a vacuum-filter or through a filter-press, by means of which the solid carbonate of lime will be separated from the bulk of the water and the impurities dissolved therein. Washing with water will remove the last traces of soluble impurities in the carbonate. I prefer to run the milk of carbonate of lime from the screens or other mechanical separators into a reservoir provided with a mechanical stirrer and from there into a vacuum-filter of ordinary form, from which the carbonate of lime as a more or less dry cake is removed and dried either by exposure to the air or in any suitable drier. The resulting dried material will be substantially pure carbonate of lime. This calcium carbonate consists of microscopically small extremely finely divided substantially uniform amorphous particles or loose aggregates thereof, capable when dried of being reduced to an impalpable powder.

The amorphous particles have no crystalline structure nor do they show in themselves the presence of any organic forms or residues thereof. The specific weight of my new carbonate of lime, when dried and powdered, ranges from seventy-eight to ninety-four grams per one hundred cubic centimeters when the drying temperature does not materially exceed 212° Fahrenheit. If, however, my new carbonate of lime is dried at a temperature greatly exceeding 212° Fahrenheit, the specific weight will be higher. The carbonate may show traces of causticity, especially when the residues are not subjected, preliminary to the mechanical separation, to the action of carbonic acid to convert the caustic into carbonate or to other acid to dissolve the caustic.

My new carbonate when dried and powdered does not form into aggregates or balls, and hence passes readily through screens of from twenty to sixty mesh per linear inch, and slowly through screens of from eighty to one hundred mesh per linear inch.

Of the numerous forms of more or less finely-divided carbonates of lime at present on the market those which, superficially considered, most closely resemble my new carbonate are "precipitated chalk," so called, and chalk-whiting. Precipitated chalk is readily distinguishable from my new carbonate in having a much lower specific weight—namely, from fifty to seventy-five grams per one hundred cubic centimeters. Precipitated chalk also tends to "ball" or form into relatively large cohesive aggregates, and hence does not readily pass through a twenty or forty mesh screen, and extremely slowly through a sixty or eighty mesh screen. Chalk-whiting, like precipitated chalk, tends to ball, and therefore does not readily pass through screens of the indicated mesh. The specific weight of chalk-whiting ranges between one hundred and five to one hundred and ten grams per one hundred cubic centimeters, and is therefore considerably higher than the specific weight of my new carbonate when the drying temperature does not materially exceed 212° Fahrenheit. Chalk-whiting under the microscope invariably presents particles which in their forms show the origin of the raw material, the chalk being the decayed residue of micro-organisms. While a great many of the chalk particles resemble amorphous forms, there are always present hook-like or ring-like or scale-like particles not formed by loose aggregates of smaller particles of the chalk.

The new carbonate of lime will, as stated, be adapted for use as whiting, paris-white, gilders' white, &c. Moreover, it forms a basis for the manufacture of numerous lime-salts. For instance, by dissolving the pure carbonate of lime in the proper acid solutions of pure lime acetate, lime sulfite, or bisulfite are formed, which require only concentration and crystallization to obtain the pure lime-salts in dry form. To obtain these lime-salts, it is not necessary that the carbonate of lime be in dry form, since the thin milk of carbonate of lime coming from the screens may be directly treated with acetic or sulfurous acid, the resulting solution being concentrated, as stated.

In carrying out the process above outlined for the production of my new carbonate of lime any suitable apparatus may be employed, and in the accompanying drawings I illustrate a form of apparatus which may be used.

Figure 1 is a side elevation, and Fig. 2 a detailed section on the line 2 2 of Fig. 1.

In the above views corresponding parts are represented by the same numerals of reference.

Referring to Fig. 1, 1 represents the mixing or receiving tank, into which the residues are placed and to which water is added for converting said residues into a thin milk, as stated. When it is desired to subject the residue in this mixer to chemical treatment for dissolving out the caustic lime or for converting said caustic lime into carbonate of lime, the necessary appliances are to be employed. For example, a perforated injection-coil 2 is employed, as shown in dotted lines, for injecting carbonic acid into the mixer, so as to convert said caustic lime into carbonate of lime. As stated, however, this treatment is not absolutely necessary, and it may equally well be carried out after the mechanical separation of the carbonate of lime from its impurities as before such separation. The water may be admitted through a suitable pipe 3. The mixer 1 is provided with suitable stirring-arms 4 4, operated from the vertical shaft 5, by which the material will be thoroughly agitated and the necessary thin milk produced. Power to the shaft 5 may be communicated from a line-shaft 6 or in any other suitable way. From the mixing-tank the thin milk of carbonate of lime is pumped by a pump 7 (preferably a rotary pump) to the mechanical separating apparatus, which in the drawings comprises two revolving screens 8 and 9. The first-mentioned screen may be of a relatively coarse mesh—for instance, eighty meshes to the linear inch; but the screen 9 should be of a very fine mesh—say one hundred and fifty or two hundred meshes to the linear inch—so as to allow only for the passage through the same of the minute particles of carbonate. These screens are operated from suitable shafts 10 10, as is common, and the tailings pass off through suitable chutes 11 11. These chutes may be separate or be connected to a common duct or pipe 12, as shown in Fig. 1. The filtrate passing from the screen 9, and which consists almost entirely of carbonate of lime and water, may be passed to a suitable receiving-reservoir or directly into a vacuum-filter 14, as shown in Fig. 1. By preference the screen 15 of said filter is made inclined and is connected to a portion 16 of one end of the filter, which portion is hinged at 17, so that it may be moved down to the position shown in dotted lines, and constitutes a chute for effecting the easy removal of the filtered carbonate. The vacuum-pipe 18 connects with the vacuum-filter, preferably above the screen 15, as shown in Fig. 2; but a hood 19 is provided, so as to direct the vacuum or suction beneath said screen. The object of connecting the suction end of the vacuum-pipe 18 to the filter above the screen 15 is to overcome the danger of the fluids entering said vacuum-pipe. The said vacuum-pipe 18 connects with a vacuum-pump 20, which pump also is connected by a pipe 21 to a vacuum-tank 22, in which a vacuum may be maintained. A three-way valve 24 is provided to cut off the vacuum-pump 20 from the vacuum-pipe 18 and connect said vacuum-pump directly with the tank 22 or for cutting off said tank from the vacuum-pump and connecting said pump with the pipe 18 or for connecting said tank 22 with the pipe 18 and cutting off the vacuum-pump, it being possible, therefore, to operate the filter from the pump or from the tank and to allow the pump to effect the desired vacuum in the tank 22 during the time that the material is being removed from the screen 15, the pipe 18 being provided with a valve 25, so as to cut off the filter. The discharge-pipe 26 from the vacuum-filter connects with the vacuum-tank 22, a three-way valve 27 being placed in said pipe, so that the tank may be connected with the atmosphere when it is to be discharged. The tank is provided with the valved draw-off pipe 28. After the carbonate in the vacuum-filter 14 has been freed from the water in which it was suspended it is allowed to dry, either naturally in the air or is removed down the inclined screen 15 and section 16 into a suitable drier 29 of any convenient type, by which it will be dried, the resulting carbonate being in the form of a very fine dry powder or in friable lumps, as explained.

In the drawings I show the vacuum-filter as being provided with an overflow-pipe 31, which preferably connects with the mixing-tank 1, and the purpose of which is twofold, said overflow-pipe serving not only to prevent the liquid from overflowing the filter, but also acting to give notice to the attendant on the apparatus when a sufficient amount of the carbonate has been introduced into the filter, it being understood that until the carbonate has formed a very considerable layer upon the screen 15 any water which may overflow through the pipe 31 will be comparatively clear, but that as soon as such water presents a milky appearance an ample indication will be given that a sufficient amount of the carbonate has accumulated upon the screen 15 to be subjected to the effect of the vacuum.

If desired, the mechanical purification of the soda-ash and lime prior to their combination in the causticizing-kettle can be effected, whereby the caustic-soda residues will be free of impurities. For instance, this might be effected by the screening, floating, jigging, or other mechanical separation of caustic milk of lime and the filtration of the soda-ash solution, which milk of lime and soda-ash solution will be prepared and purified before their action upon each other, whereby the residues obtained will be free from impurities, as I have described and claimed in my application filed December 16, 1897, and numbered serially 662,165, or instead the residues may be dried, reduced to a powder, and the impurities bolted off, this being possible by reason of the peculiar characteristics of the carbonate-of-lime particles, as before explained, the caustic present being removed either before or after the bolting operation, as I have described and claimed in my application filed December 16, 1897, and numbered serially 662,166.

Having now described my invention, what I claim as new therein, and desire to secure by Letters Patent, is as follows:

1. As a new article of manufacture, carbonate of lime in the form of microscopically small, extremely finely divided, amorphous particles or loose aggregates thereof, having when dried and powdered a specific weight of from seventy-eight to ninety-four grams per one hundred cubic centimeters when the drying temperature does not materially exceed 212° Fahrenheit, substantially as set forth.

2. As a new article of manufacture, carbonate of lime in the form of microscopically small, extremely finely divided, amorphous particles or loose aggregates thereof, having when dried and powdered a specific weight of from seventy-eight to ninety-four grams per one hundred cubic centimeters when the drying temperature does not materially exceed 212° Fahrenheit and having a slight caustic reaction, substantially as set forth.

3. As a new article of manufacture, carbonate of lime in the form of microscopically small, extremely finely divided, amorphous particles or loose aggregates thereof, having when dried and powdered a specific weight of from seventy-eight to ninety-four grams per one hundred cubic centimeters when the drying temperature does not materially exceed 212° Fahrenheit and having a slight caustic reaction caused by the presence of traces of hydrated lime, substantially as set forth.

4. As a new article of manufacture, carbonate of lime in the form of microscopically small, extremely finely divided, amorphous particles or loose aggregates thereof, having when dried and powdered a specific weight of from seventy-eight to ninety-four grams per one hundred cubic centimeters, when the drying temperature does not materially exceed 212° Fahrenheit and capable when dried and powdered of passing easily through a screen of from forty to sixty meshes per linear inch, substantially as set forth.

5. As a new article of manufacture, dry carbonate of lime in the form of microscopically small, extremely finely divided amorphous particles or loose aggregates thereof, having when powdered a specific weight of from seventy-eight to ninety-four grams per one hundred cubic centimeters when the drying temperature does not materially exceed 212° Fahrenheit, substantially as set forth.

6. As a new article of manufacture, dry, powdered carbonate of lime in the form of microscopically small, extremely finely divided amorphous particles or loose aggregates thereof, having a specific weight of from seventy-eight to ninety-four grams per one hundred cubic centimeters when the drying temperature does not materially exceed 212° Fahrenheit, substantially as set forth.

7. As a new article of manufacture, dry, powdered carbonate of lime in the form of microscopically small, extremely finely divided amorphous particles or loose aggregates thereof, having a specific weight of from seventy-eight to ninety-four grams per one hundred cubic centimeters when the drying temperature does not materially exceed 212° Fahrenheit, and capable of passing easily through a screen of from forty to sixty meshes per linear inch, substantially as set forth.

8. The process of utilizing residues obtained in the manufacture of caustic soda and caustic potash, comprising essentially carbonate of lime, caustic or hydrated lime, and insoluble impurities, which consists in removing the caustic lime, substantially in the manner specified, mixing the residues with water so as to form a thin milk, and in subjecting said milk, for removal of the impurities, to the action of mechanical separating devices.

9. The process of utilizing residues obtained in the manufacture of caustic soda and caustic potash, comprising essentially carbonate of lime, caustic or hydrated lime, and insoluble impurities, which consists in removing the caustic lime, substantially as specified, mixing the residues with water so as to form a thin milk, and in passing said milk through a screen of very fine mesh so as to effect the separation of the carbonate from such impurities, leaving the latter on the screen.

10. The process of utilizing residues obtained in the manufacture of caustic soda and caustic potash, comprising essentially carbonate of lime, caustic or hydrated lime and insoluble impurities, which consists in removing the caustic lime, substantially as specified, mixing the residues with water so as to form a thin milk, and in passing said milk through a series of screens of progressively finer mesh by which the carbonate will be separated from said impurities.

11. The process of utilizing residues obtained in the manufacture of caustic soda and caustic potash, comprising essentially carbonate of lime, caustic or hydrated lime and insoluble impurities, which consists in removing the caustic lime, substantially as specified, adding water to the residues to form a thin milk, in subjecting said milk to the action of a mechanical separator so as to separate the carbonate from the insoluble impurities, and in then removing the carbonate from the water by the action of a vacuum-filter.

12. The process of utilizing the residues from the manufacture of caustic soda and caustic potash which comprise carbonate of lime, caustic or hydrated lime and insoluble impurities, which consists in mixing the residues with water so as to form a thin milk, in removing the caustic lime by converting said caustic lime into carbonate, and in subsequently subjecting the thin milk to the action of a mechanical separator by which the carbonate will be separated from the insoluble impurities, substantially as set forth.

13. The process of utilizing the residues from the manufacture of caustic soda and caustic potash which comprise carbonate of lime, caustic or hydrated lime and insoluble impurities, which consists in removing the caustic, substantially in the manner specified, in adding water to the residues to form a thin milk, in subjecting said milk to the action of a mechanical separator, so as to separate the carbonate from the insoluble impurities, in subjecting the separated carbonate and water to the action of a vacuum-filter so as to remove most of the water, and in further drying the carbonate, substantially as set forth.

14. An apparatus for treating residues obtained in the manufacture of caustic soda and caustic potash, comprising carbonate of lime, caustic or hydrated lime and insoluble impurities, said apparatus consisting of a mixing-tank in which the residues are subjected to the action of water, whereby the caustic lime will be dissolved, a series of screens of progressively finer mesh to which the mixture will be successively directed and by which the carbonate of lime will be separated from the insoluble impurities, a vacuum-filter for removing the water from the separated carbonate, an inclined screen in said filter for receiving the filtrate, and a direct vacuum-pump connection beneath said screen substantially as set forth.

This specification signed and witnessed this 7th day of February, 1898.

HERMAN E. STURCKE.

Witnesses:
FRANK L. DYER,
LEONARD HUNTRESS DYER.